US009770995B2

(12) United States Patent
Chang

(10) Patent No.: US 9,770,995 B2
(45) Date of Patent: Sep. 26, 2017

(54) MULTI-FLOOR CHARGING SYSTEM FOR ELECTRIC VEHICLE

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 195 days.

(21) Appl. No.: 14/819,990

(22) Filed: Aug. 6, 2015

(65) Prior Publication Data

US 2016/0303991 A1    Oct. 20, 2016

(30) Foreign Application Priority Data

Apr. 20, 2015  (CN) .......................... 2015 1 0186369

(51) Int. Cl.
| | |
|---|---|
| *H02J 7/00* | (2006.01) |
| *B60L 11/18* | (2006.01) |
| *B60L 11/00* | (2006.01) |

(52) U.S. Cl.
CPC ......... *B60L 11/1848* (2013.01); *B60L 11/005* (2013.01); *B60L 11/1833* (2013.01); *B60L 11/1844* (2013.01); *B60L 11/1862* (2013.01); *B60L 2230/32* (2013.01); *B60L 2250/14* (2013.01); *Y02E 60/721* (2013.01); *Y02T 10/7005* (2013.01); *Y02T 90/121* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
USPC .................................................. 320/106–115
See application file for complete search history.

(56) References Cited

U.S. PATENT DOCUMENTS

| | | | | |
|---|---|---|---|---|
| 2010/0320965 | A1* | 12/2010 | Kissel, Jr. | ................. B60L 5/40 |
| | | | | 320/109 |
| 2011/0115425 | A1* | 5/2011 | Olsson | .................. B60L 3/0046 |
| | | | | 320/101 |
| 2012/0043943 | A1* | 2/2012 | Dyer | .................... B60L 11/1809 |
| | | | | 320/137 |
| 2012/0139487 | A1* | 6/2012 | Kim | ...................... B60R 16/033 |
| | | | | 320/109 |

* cited by examiner

*Primary Examiner* — Binh Tat
(74) *Attorney, Agent, or Firm* — Steven Reiss

(57) ABSTRACT

A charging system for a multi-floor tower for the parking of electric vehicles includes a super capacitor, a charging port connecting with the electric vehicle, and a charging controller. The charging controller includes a diverter switch, a first current limited portion, a second current limited portion, and a charging control portion. The charging control portion is connected with the diverter switch, the super capacitor, and the charging port. The first current limited portion outputs a first stable current and is interconnected between the diverter switch and the charging port. The second current limited portion outputs a second stable current and is interconnected between the super capacitor and the charging port. The magnitude of the first stable current is larger than the magnitude of the second stable current.

12 Claims, 3 Drawing Sheets

MULTI-FLOOR CHARGING SYSTEM FOR ELECTRIC VEHICLE

FIELD

The subject matter herein generally relates to battery recharging systems.

BACKGROUND

In the field of the electric vehicle industry, a charging system is important for an electric vehicle. A charging system can include a connection to a power source. The charging system can also include a vehicle coupling device configured to transfer power to the vehicle.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Implementations of the present technology will now be described, by way of example only, with reference to the attached figures.

DETAILED DESCRIPTION

Figure 1:
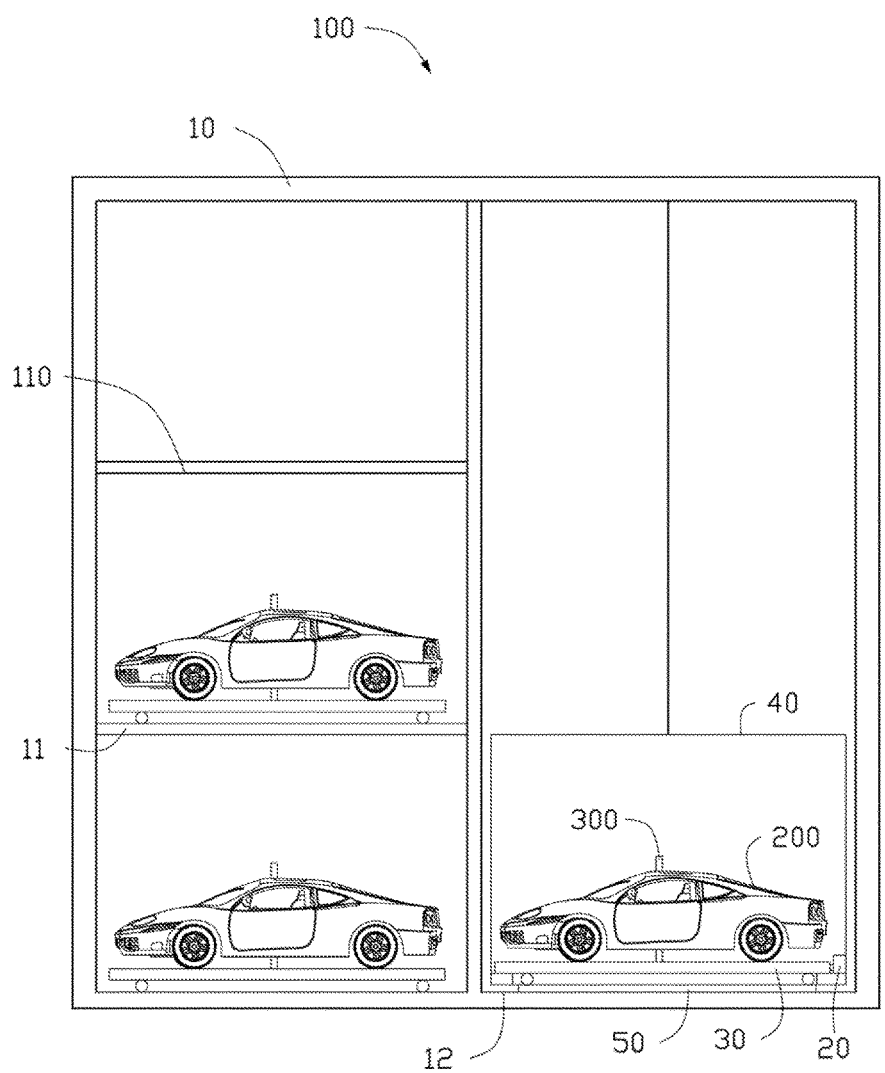
FIG. 1 is a diagrammatic, cross sectional side view of a first embodiment of a charging system of a tower housing a plurality of parked electric vehicles.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure relates to a charging system of a tower for parked electric vehicles.

FIG. 1 illustrates a parking tower 100 of a first embodiment. The parking tower 100 includes a garage 10, a moving device 20, a plurality of platforms 30, a lifting mechanism 40, a stage conveyer 50, a control system 60, and a plurality of charging systems 300.

Figure 2:
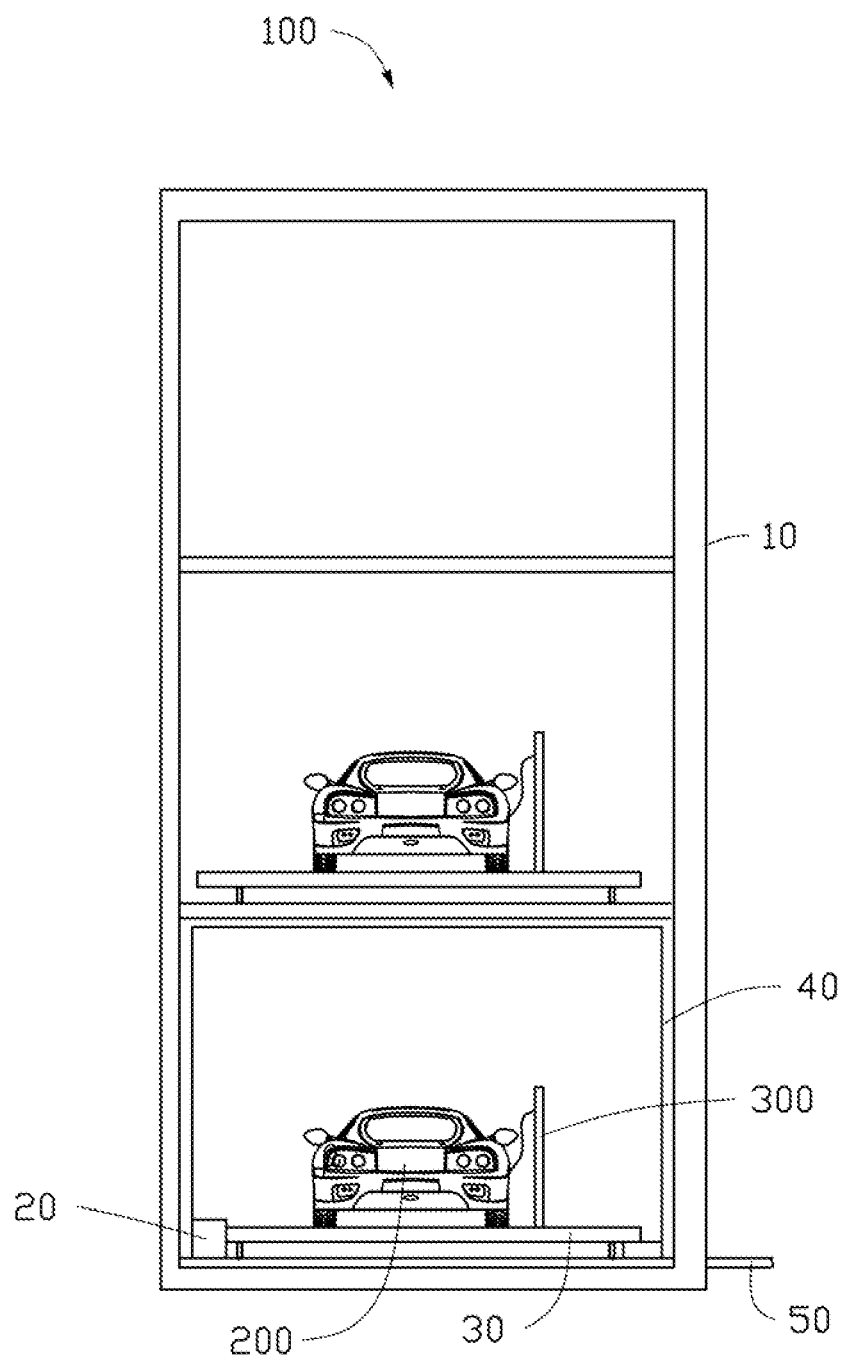
FIG. 2 is a diagrammatic, cross sectional front view of the first embodiment of the charging system of FIG. 1.

FIG. 2 illustrates the parking tower 100 from a front cross section view. The garage 10 includes two parking floors 11 and a parking entrance 12. The parking floor 11 includes a parking space 110 for an electric vehicle 200. The electric vehicle 200 enters the parking tower 100 through the parking entrance 12.

The platform 30 carries the electric vehicle 200 and the charging system 300. In the illustrated embodiment, the platform 30 has a flat top surface, and can have wheels. The wheels are used to slide the platforms 30 easily.

The lifting mechanism 40 is used to lift the platforms 30 and the electric vehicle 200 from a first position into a second position. The first position is defined in the parking tower 100 and corresponds to the parking entrance 12. The second position is defined in the parking tower 100 and corresponds to the parking space 110. The lifting mechanism 40 is also used to lift the platforms 30 and the electric vehicle 200 from the second position into the first position.

The moving device 20 is coupled to the lifting mechanism 40 and is used to slide the platform 30 and the electric vehicle 200 into the parking space 110 of the parking floor 11. The moving device 20 also is used to slide the platform 30 and the electric vehicle 200 out the parking space 110 toward the lifting mechanism 40.

The stage conveyer 50 is used to move the Platform 30 to the first position when the first position has been vacated by another platform 30 loaded with an electric vehicle 200. In the present parking tower 100, the stage conveyer 50 is a conveyor belt, the platform 30 can be slid out from the lifting mechanism 40 or slid into the lifting mechanism 40 by the conveyor belt.

The control system 60 includes a controller 61 and a communication system 62. The controller 61 saves first information of vehicle management of the parking tower 100, and the first information includes elapsed parking duration of the electric vehicle 200, a number of the parking space 110, and a position of the parking space 110. The controller 61 controls the moving device 20 and the lifting mechanism 40 to move the electric vehicle 200 into the parking space 110 or to move the electric vehicle 200 and the platform 30 into the first position. The communication system 62 is used to transmit the first information. In the present control system 60, the communication system 62 is a wireless communication device.

The charging systems 300 is used to charge the electric vehicle 200. In the present embodiment, each one of the charging systems 300 is positioned on one of the platforms 30.

Figure 3:
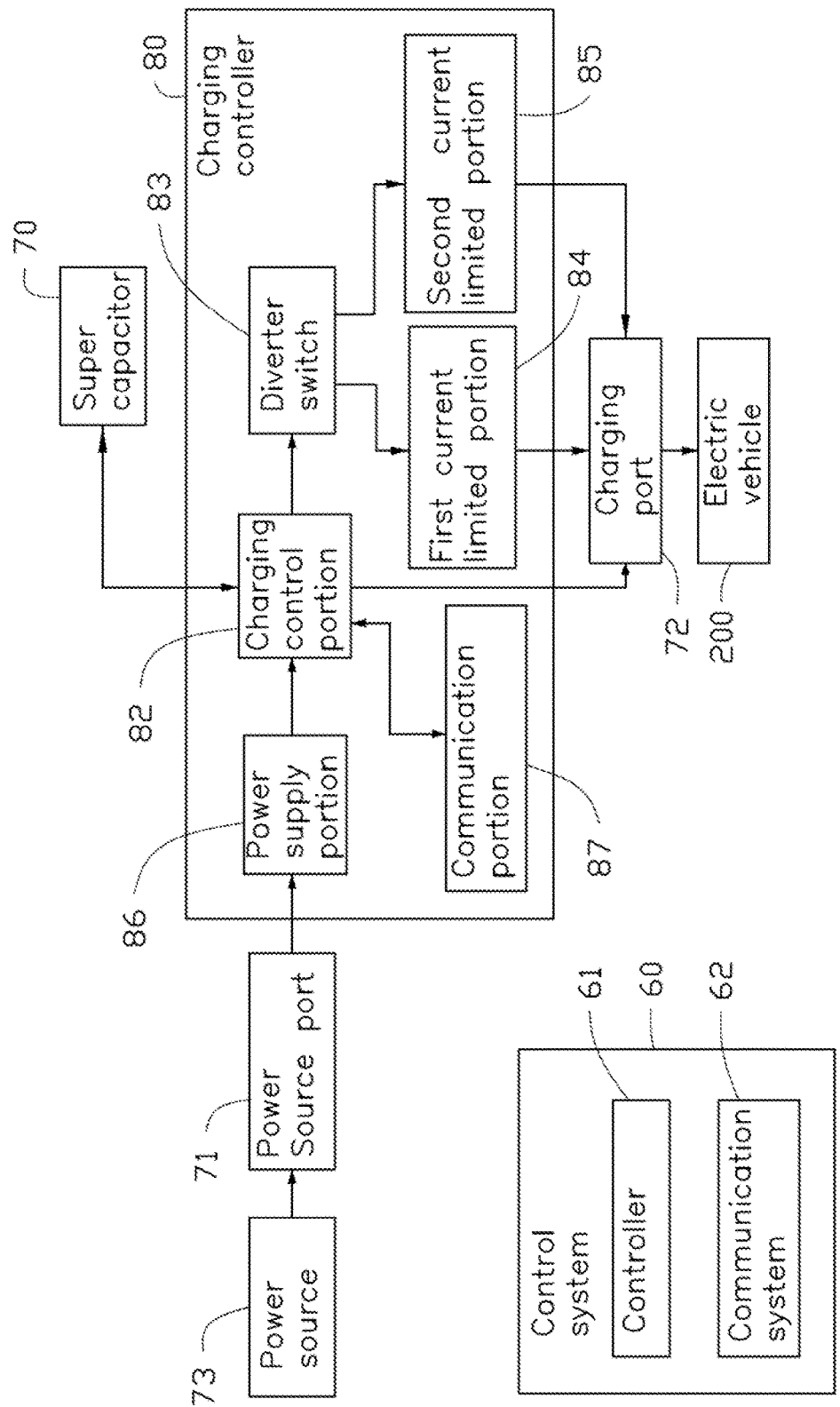
FIG. 3 is a block diagram illustrating the first embodiment of the charging system of FIG. 1.

FIG. 3 is a block diagram illustrating an example of the first embodiment of the charging system 300. The charging system 300 includes a super capacitor 70, a charging controller 80, a power source port 71 connected with a power source 73, and a charging port 72 connected with the electric vehicle 200. In the illustrated embodiment, the control system 60 is connected with the charging controller 80 by wireless communication device. In others embodiment, the control system 60 may be electrically connected with the charging controller 80.

The charging controller 80 includes a charging control portion 82, a diverter switch 83, a first current limited portion 84, a second current limited portion 85, a power supply portion 86, and a communication portion 87. The power supply portion 86 connects with the power source port 71 and the charging control portion 82. The charging control portion 82 is used to control the diverter switch 83 and connects with the diverter switch 83, the super capacitor 70, the communication portion 87, and the charging port 72.

The first current limited portion 84 is used to output a first stable current and is interconnected between the diverter switch 83 and the charging port 72. The second current limited portion 85 is used to output a second stable current and is interconnected between the diverter switch 83 and the charging port 72. The magnitude of the first stable current is larger than the magnitude of the second stable current. In the illustrated embodiment, the ratio of the magnitude of the first stable current to the magnitude of the second stable current is about 10:1. The power supply portion 86 is used to translate an input voltage to an output rechargeable voltage and convert alternating current (AC) to direct current (DC).

When the super capacitor 70 is charged by the power source 73, the power source 73 inputs charging energy to the power supply portion 86 passing through the power source port 71. The power supply portion 86 translates a voltage of the charging energy into a voltage of receivable energy and the charging control portion 82 controls the diverter switch 83 to turn off electrical connections between the first current limited portion 84, the second current limited portion 85, and the super capacitor 70. The receivable energy is transmitted to the super capacitor 70 passing through the charging control portion 82.

The electric vehicle 200 enters the parking tower 100 passing through the parking entrance 12 and stops on the platform 30. A battery of the electric vehicle 200 is connected with the charging port 72 and a driver puts the parking duration into the control system 60. In the illustrated embodiment, the driver inputs into the control system 60 through an input device of the parking tower 100. In other embodiments, the driver makes inputs into the control system 60 by the driver's smart phone. The controller 61 of the control system 60 controls the moving device 20 and the lifting mechanism 40 to move the electric vehicle 200 into the parking space 110. The charging control portion 82 receives the intended parking duration from the communication system 62 of the control system 60 via the communication portion 87, and the charging control portion 82 catches the second information of the electric vehicle 200 from the charging port 72. The second information includes a remaining charge of the electric vehicle 200, and a rated value of the battery of the electric vehicle 200. The charging control portion 82 calculates a magnitude of first charging currents for fully charging the battery of the electric vehicle 200 within the parking duration and controls the diverter switch 83 to electrically connect the super capacitor 70 with either the first current limited portion 84 or the second current limited portion 85.

When the parking duration is not input by the driver, the control system 60 defines the parking duration as equal to an average of the parking durations of all of the electric vehicles 200. In other embodiments, the charging system 300 includes an input device. The driver inputs the parking duration into the charging system 300 through the input device.

The charging system 300 satisfies the following conditions.

Condition 1: when the magnitude of the first charging current is larger than or equal to the magnitude of the first stable current, the charging control portion 82 controls the diverter switch 83 to electrically connect with the super capacitor 70 and the first current limited portion 84.

Condition 2: when the magnitude of the first charging current is smaller than or equal to the magnitude of the second stable current, the charging control portion 82 controls the diverter switch 83 to electrically connect with the super capacitor 70 and the second current limited portion 85.

Condition 3: when the magnitude of the first charging current is between the magnitude of the first stable current and the magnitude of the second stable current, the charging control portion 82 controls the diverter switch 83 to electrically connect with the super capacitor 70 and the first current limited portion 84 for a first time period Following the first time period, the charging control portion controls the diverter switch 83 to electrically connect with the super capacitor 70 and the second current limited portion 85 for a second time period, the sum of the first time period and the second time period being equal to the parking duration.

Condition 4: when a remnant of the electrical charge of the battery of the electric vehicle 200 is equal to a rated value of the battery of the electric vehicle 200, the charging control portion 82 controls the diverter switch 83 to turn off a connection between the first current limited portion 84, the second current limited portion 85, and the super capacitor 70. In this situation, the charging system 300 prevents charging of the electric vehicle 200.

The embodiments shown and described above are only examples. Many details are often found in the art such as the other features of a charging system for an electric vehicle. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A charging system of a parking tower for an electric vehicle, the charging system comprising:
   a super capacitor;
   a charging port coupled to the super capacitor and configured to connected with the electric vehicle;
   a control system; and
   a charging controller including:
      a diverter switch,
      a first current limited portion configured to output a first stable current and interconnected between the diverter switch and the charging port,
      a second current limited portion configured to output a second stable current and interconnected between the diverter switch and the charging port, and
      a charging control portion configured to control the diverter switch and connected with the diverter switch, the super capacitor, and the charging port;
   wherein the magnitude of the first stable current is larger than the magnitude of the second stable current;
   wherein the control system is configured to receive a parking duration input to the control system; and
   wherein, when the parking duration is not input to the control system, the control system is configured to define the parking duration as equal to an average of the parking durations of all of a plurality of electric vehicles parked in the parking tower.

2. The charging system in accordance with claim 1, wherein the charging control portion is configured to calculate a magnitude of first charging currents for charging fully a battery of the electric vehicle within parking duration and controls the diverter switch to electrically connect with one of the super capacitor and the first current limited portion or the super capacitor and the second current limited portion.

3. The charging system in accordance with claim 2, wherein the charging system includes a communication portion, the charging control portion receives first information from the control system via the communication portion, the first information includes the parking duration.

4. The charging system in accordance with claim 2, wherein the charging control portion catches second information of the electric vehicle from the charging port, the second information includes a remaining charge of the electric vehicle, and a rated value of the battery of the electric vehicle.

5. The charging system in accordance with claim 1, wherein the charging controller includes a power supply portion connected with the charging control portion, the charging system includes a power source port connected with the power supply portion and a power source, the power source inputs charging energy to the super capacitor passing through the power source port, the power supply portion, and the charging control portion.

6. A parking tower comprising:
a garage includes two parking floors;
a plurality of platforms, the platform configured to loaded with a electric vehicle;
a lifting mechanism configured for lifting the platforms;
a moving device coupling to the lifting mechanism and configured for sliding the platform into the parking floor from the lifting mechanism;
a control system configured to control the lifting mechanism and the moving device; and
a plurality of charging systems, the charging systems comprising:
a super capacitor;
a charging port coupled to the super capacitor and configured to connected with the electric vehicle; and
a charging controller including a diverter switch, a first current limited portion configured to output a first stable current and interconnected between the diverter switch and the charging port, a second current limited portion configured to output a second stable current and interconnected between the diverter switch and the charging port, and a charging control portion configured to control the diverter switch and connected with the diverter switch, the super capacitor, and the charging port;
wherein the magnitude of the first stable current is larger than the magnitude of the second stable current;
wherein each one of the charging systems is positioned on one of the platforms;
wherein the control system is configured to receive a parking duration input to the control system; and
wherein, when the parking duration is not input to the control system, the control system is configured to define the parking duration as equal to an average of the parking durations of all of a plurality of electric vehicles parked in the parking tower.

7. The parking tower in accordance with claim 6, wherein the charging control portion is configured to calculate a magnitude of first charging currents for charging fully a battery of the electric vehicle within parking duration and controls the diverter switch to electrically connect with one of the super capacitor and the first current limited portion or the super capacitor and the second current limited portion.

8. The parking tower in accordance with claim 7, wherein the charging system includes a communication portion, the charging control portion receives first information from the control system via the communication portion, the first information includes the parking duration.

9. The parking tower in accordance with claim 7, wherein the charging control portion catches second information of the electric vehicle from the charging port, the second information includes a remaining charge of the electric vehicle, and a rated value of the battery of the electric vehicle.

10. The parking tower in accordance with claim 6, wherein the charging controller includes a power supply portion connected with the charging control portion, the charging system includes a power source port connected with the power supply portion and a power source, the power source input charging energy to the super capacitor passing through the power source port, the power supply portion, and the charging control portion.

11. The parking tower in accordance with claim 6, wherein the garage includes a parking entrance, the electric vehicle enters the parking tower passing through the parking entrance and stops on the platform.

12. The parking tower in accordance with claim 11, wherein the parking tower includes a stage conveyer configured to moving the platform to a first position, the first position correspond to the parking entrance.

* * * * *